United States Patent
Thanigachalam et al.

(10) Patent No.: US 11,852,550 B2
(45) Date of Patent: *Dec. 26, 2023

(54) COMBINED TEMPERATURE AND PRESSURE SENSING DEVICE WITH IMPROVED ELETRONICS PROTECTION

(71) Applicant: Honeywell International Inc., Charlotte, NC (US)

(72) Inventors: Palani Thanigachalam, Karnataka (IN); Vijayakumar S, Karnataka (IN); Nirmala HJ, Karnataka (IN)

(73) Assignee: Honeywell International Inc., Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/160,227

(22) Filed: Jan. 26, 2023

(65) Prior Publication Data

US 2023/0168140 A1    Jun. 1, 2023

Related U.S. Application Data

(63) Continuation of application No. 17/248,660, filed on Feb. 2, 2021, now Pat. No. 11,592,349.

(51) Int. Cl.
    *G01L 19/00*    (2006.01)
    *G01K 7/16*    (2006.01)
    *G01L 9/00*    (2006.01)

(52) U.S. Cl.
    CPC .......... *G01L 19/0092* (2013.01); *G01K 7/16* (2013.01); *G01L 9/0035* (2013.01)

(58) Field of Classification Search
    None
    See application file for complete search history.

(56) References Cited

U.S. PATENT DOCUMENTS

| | | | |
|---|---|---|---|
| 11,592,349 B2* | 2/2023 | Thanigachalam | .... G01L 9/0033 |
| 2008/0212917 A1* | 9/2008 | Chen | .................. G01D 5/35354 385/12 |
| 2021/0239560 A1* | 8/2021 | Xu | ...................... G01L 19/0061 |

FOREIGN PATENT DOCUMENTS

| | | |
|---|---|---|
| CN | 203364882 U | 12/2013 |
| CN | 206945201 U | 1/2018 |
| CN | 207675218 U | 7/2018 |
| JP | 4882967 B2 | 2/2012 |

(Continued)

OTHER PUBLICATIONS

U.S. Appl. No. 17/248,660, filed Feb. 2, 2021, 2022-0244125.

(Continued)

*Primary Examiner* — Lisa M Caputo
*Assistant Examiner* — Nigel H Plumb
(74) *Attorney, Agent, or Firm* — Alston & Bird LLP

(57) ABSTRACT

Example apparatuses and systems for a combined temperature and pressure sensing device with improved electronic protection are provided. An example apparatus includes a media isolation chamber assembly having a sleeve member and a bellows member, a first circuit board element disposed in the bellows member and encapsulated by insulator media in the bellows member, a pressure sensing element disposed in the bellows member and electrically coupled to the first circuit board element; and a temperature sensing element disposed in the sleeve member and electrically coupled to the first circuit board element.

20 Claims, 7 Drawing Sheets

(56) References Cited

FOREIGN PATENT DOCUMENTS

WO         2019/232930 A1    12/2019
WO    WO-2019232930 A1 * 12/2019  ............ G01D 21/02

OTHER PUBLICATIONS

European search report dated Jun. 28, 2022 for EP Application No. 22151310.
European Search Report dated Mar. 2, 2022 for EP Application No. 21204810.
Ex Parte Quayle Action Mailed on Aug. 9, 2022 for U.S. Appl. No. 17/248,660.
Notice of Allowance and Fees Due (PTOL-85) dated Oct. 27, 2022 for U.S. Appl. No. 17/248,660.

\* cited by examiner

COMBINED TEMPERATURE AND PRESSURE SENSING DEVICE WITH IMPROVED ELETRONICS PROTECTION

CROSS-REFERENCE TO RELATED APPLICATIONS

This patent application is a continuation of U.S. patent application Ser. No. 17/248,660, filed Feb. 2, 2021, the content of which is incorporated herein by reference in its entirety.

BACKGROUND

Applicant has identified many technical deficiencies and problems associated with existing sensors.

BRIEF SUMMARY

Various embodiments described herein relate to methods, apparatuses, and systems for providing a combined temperature and pressure sensing device.

In accordance with various embodiments of the present disclosure, an example apparatus for sensing pressure and temperature may be provided. The example apparatus may comprise an example media isolation chamber assembly, a first example circuit board element, an example pressure sensing element, and an example temperature sensing element.

In some embodiments, the example media isolation chamber assembly may comprise an example sleeve member and an example bellows member. In some embodiments, the example bellows member may be disposed in the example sleeve member. In some embodiments, the example bellows member may house example insulator media.

In some embodiments, the first example circuit board element may be disposed in the example bellows member. In some embodiments, the first example circuit board element may be encapsulated by the example insulator media.

In some embodiments, the example pressure sensing element may be disposed in the example bellows member. In some embodiments, the example pressure sensing element may be electrically coupled to the first example circuit board element.

In some embodiments, the example temperature sensing element may be disposed in the example sleeve member. In some embodiments, the example temperature sensing element may be electrically coupled to the first example circuit board element.

In some embodiments, the example bellows member may be hermetically sealed to the example sleeve member.

In some embodiments, the example sleeve member may comprise an example body portion and an example probe portion. In some embodiments, the example body portion may comprise an example side section and an example end section. In some embodiments, the example side section may be in an example perpendicular arrangement with the example end section.

In some embodiments, the example probe portion may protrude from an outer surface of the example end section of the example body portion of the example sleeve member.

In some embodiments, the example temperature sensing element may be disposed in the example probe portion of the example sleeve member.

In some embodiments, the example bellows member may be disposed in the example body portion of the example sleeve member.

In some embodiments, the example end section may comprise at least one example media opening that may be configured to receive an example liquid substance so that the example liquid substance may be in contact with the example bellows member.

In some embodiments, the first example circuit board element may extend from within the example bellows member to within the example probe portion of the example sleeve member.

In some embodiments, the apparatus may comprise an example port assembly. In some embodiments, the example sleeve member of the example media isolation chamber assembly may be secured to an example outer surface of the example port assembly.

In some embodiments, the example port assembly may comprise an example tunnel connecting a first example opening on the example outer surface of the example port assembly to a second example opening on an example inner surface of the example port assembly.

In some embodiments, the example tunnel may be configured to convey the example insulator media to the example bellows member of the example media isolation chamber assembly through the first example opening on the example outer surface of the example port assembly.

In some embodiments, the example apparatus may comprise an example sealing member covering the second example opening on the example inner surface of the example port assembly.

In some embodiments, the example apparatus may comprise a second example circuit board element disposed within the example port assembly.

In some embodiments, the apparatus may comprise at least one example terminal connector element electrically connecting the first example circuit board element to the second example circuit board element.

In some embodiments, the apparatus may comprise an example header member comprising an example glass-to-metal seal portion. In some embodiments, the example header member may be secured to the first example circuit board element and the example port assembly.

In some embodiments, the first example circuit board element may comprise an example signal conditioning element. In some embodiments, the example pressure sensing element may be electronically coupled to the example signal conditioning element.

In some embodiments, the example signal conditioning element may be configured to output an example electrical signal indicating an example detected pressure.

In some embodiments, the first example circuit board element may comprise an example signal amplifying element. In some embodiments, the example temperature sensing element may be electrically coupled to the example signal amplifying element.

In some embodiments, the first example circuit board element may comprise an example resistor element. In some embodiments, the example resistor element may be electrically coupled to the example temperature sensing element and the example signal amplifying element.

In some embodiments, the example signal amplifying element may be configured to output an example electrical signal indicating an example detected temperature.

In some embodiments, the first example circuit board element may be configured to output a first example electrical signal indicating an example detected pressure and a second example electrical signal indicating an example detected temperature.

The foregoing illustrative summary, as well as other exemplary objectives and/or advantages of the disclosure, and the manner in which the same are accomplished, are further explained in the following detailed description and its accompanying drawings.

BRIEF DESCRIPTION OF THE DRAWINGS

The description of the illustrative embodiments may be read in conjunction with the accompanying figures. It will be appreciated that, for simplicity and clarity of illustration, elements illustrated in the figures have not necessarily been drawn to scale, unless described otherwise. For example, the dimensions of some of the elements may be exaggerated relative to other elements, unless described otherwise. Embodiments incorporating teachings of the present disclosure are shown and described with respect to the figures presented herein, in which.

DETAILED DESCRIPTION OF THE INVENTION

Figure 1A:
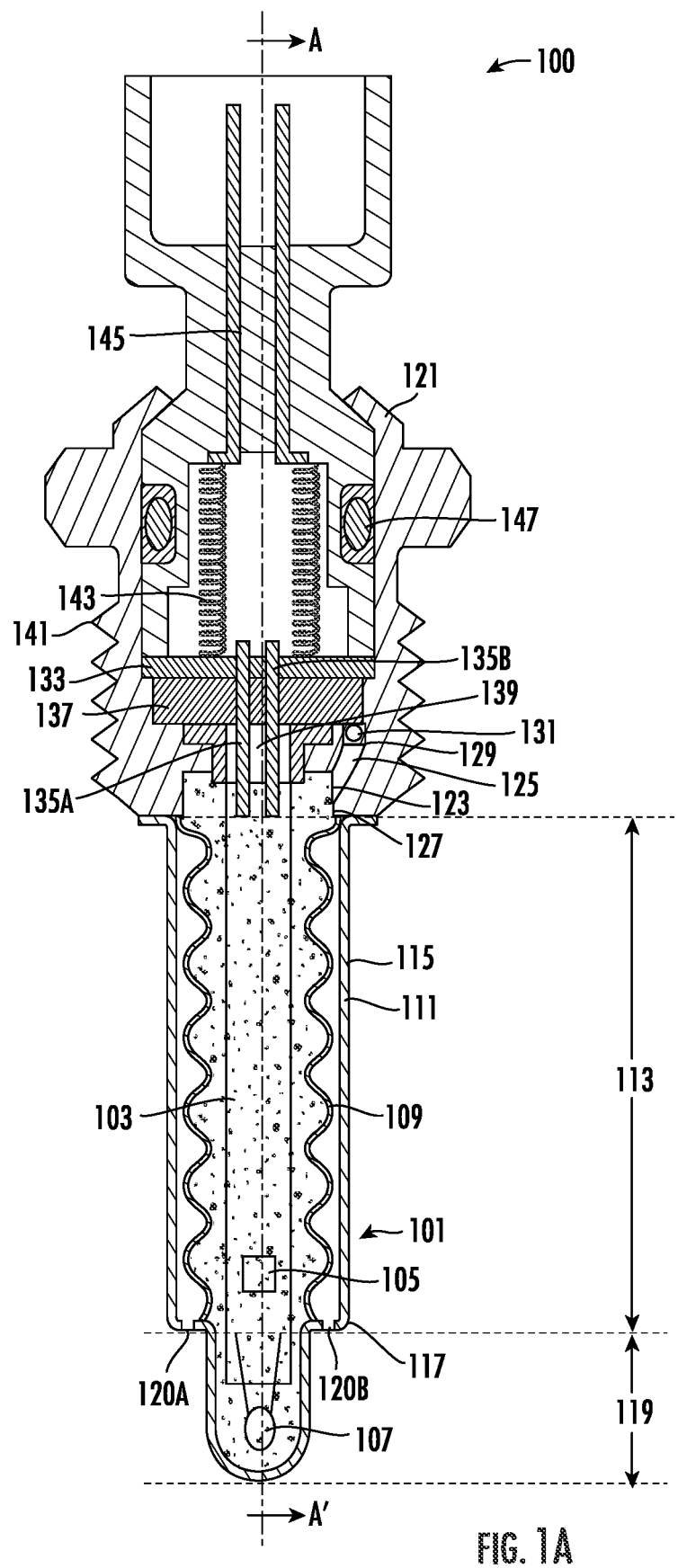
FIG. 1A illustrates an example cross-sectional front view of an example apparatus for sensing pressure and temperature in accordance with various embodiments of the present disclosure.

Some embodiments of the present disclosure will now be described more fully hereinafter with reference to the accompanying drawings, in which some, but not all embodiments of the disclosure are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout.

The phrases "in one embodiment," "according to one embodiment," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

The words "example" or "exemplary" are used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that a specific component or feature is not required to be included or to have the characteristic. Such component or feature may be optionally included in some embodiments, or it may be excluded.

The terms "electronically coupled," "electrically coupled," "electronically connected," or "electrically connected" in the present disclosure refer to two or more electrical elements (for example but not limited to, resistor element(s), capacitor element(s), inductor element(s), diode element(s)) and/or electric circuit(s) being connected through wired means (for example but not limited to, conductive wires or traces) and/or wireless means (for example but not limited to, electromagnetic field), such that energy (for example but not limited to electric current), signals, data and/or information may be transmitted to and/or received from the electrical elements and/or electric circuit(s) that are electronically coupled.

The term "element" in the present disclosure refers to one or more separable electronic component(s) or independent electronic unit(s) that may be used to form, construct, or otherwise be part of an electronic system. In some embodiments, an element may comprise one or more electronic device(s) or physical entity/entities that may provide one or more particular functions to the electronic system.

The term "pressure sensing element" in the present disclosure refers to an element that detects, senses, and/or measures the pressure of gaseous substance and/or liquid substance. In some embodiments, the pressure sensing element converts detected pressure into an analogues electrical signal. In some embodiments, an example pressure sensing element in accordance with various embodiments of the present disclosure may be a micro-electromechanical system (MEMS) pressure sensing die that is built and packaged using MEMS techniques.

Figure 4:
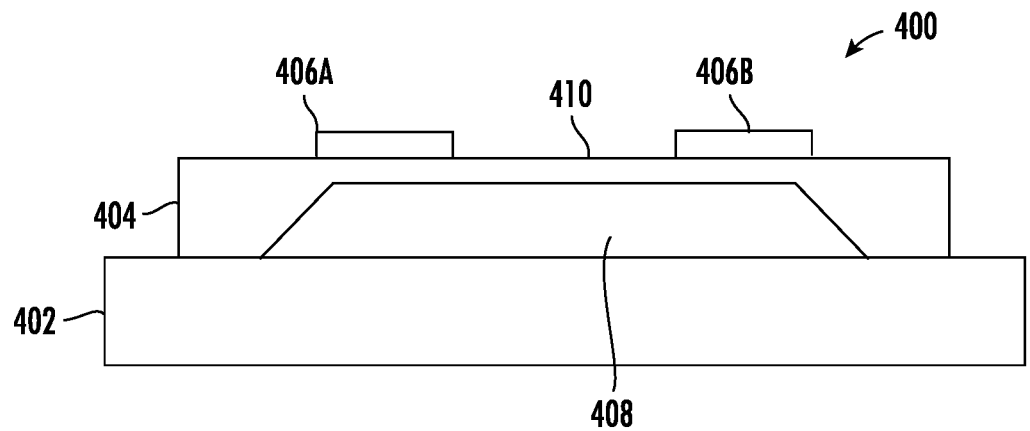
FIG. 4 illustrates an example pressure sensing element in accordance with various embodiments of the present disclosure.

For example, an example pressure sensing element in accordance with various embodiments of the present disclosure is an example MEMS piezoresistive pressure sensor die. In this example, the example MEMS piezoresistive pressure sensor die may convert a pressure difference detected on a diaphragm into an electrical signal. Referring now to FIG. 4, an example pressure sensing element 400 is provided. In the example shown in FIG. 4, the example pressure sensing element 400 is in the form of an example MEMS piezoresistive pressure sensor die.

As shown in FIG. 4, the example pressure sensing element 400 comprises a substrate 402, a diaphragm 404, and a plurality of piezoresistors (for example, four piezoresistors including a piezoresistor 406A and a piezoresistor 406B).

In some embodiments, the substrate 402 comprises material such as, but not limited to, glass, metal, and/or the like. In some embodiments, the substrate 402 comprises one or more materials that have similar thermal properties as the diaphragm 404.

In some embodiments, the diaphragm 404 is bonded onto the substrate 402. In some embodiments, the diaphragm 404 may comprise material such as, but not limited to, silicon. In some embodiments, the diaphragm 404 may be formed through a chemical etching process. For example, baths of etching chemicals may be applied on the silicon material of the diaphragm 404, forming a cavity 408.

In some embodiments, the example pressure sensing element 400 detects, senses, and/or measures pressure applied on the outer surface 410 of the diaphragm 404. For example, a plurality of piezoresistors (for example, four piezoresistors including the piezoresistor 406A and the piezoresistor 406B) may be embedded on the outer surface 410 of the diaphragm 404 (and/or within the diaphragm 404). In the present disclosure, a piezoresistor refers to a resistor that exhibits a change in its electrical resistance when mechanical strain or stress is applied on the resistor.

Figure 5:
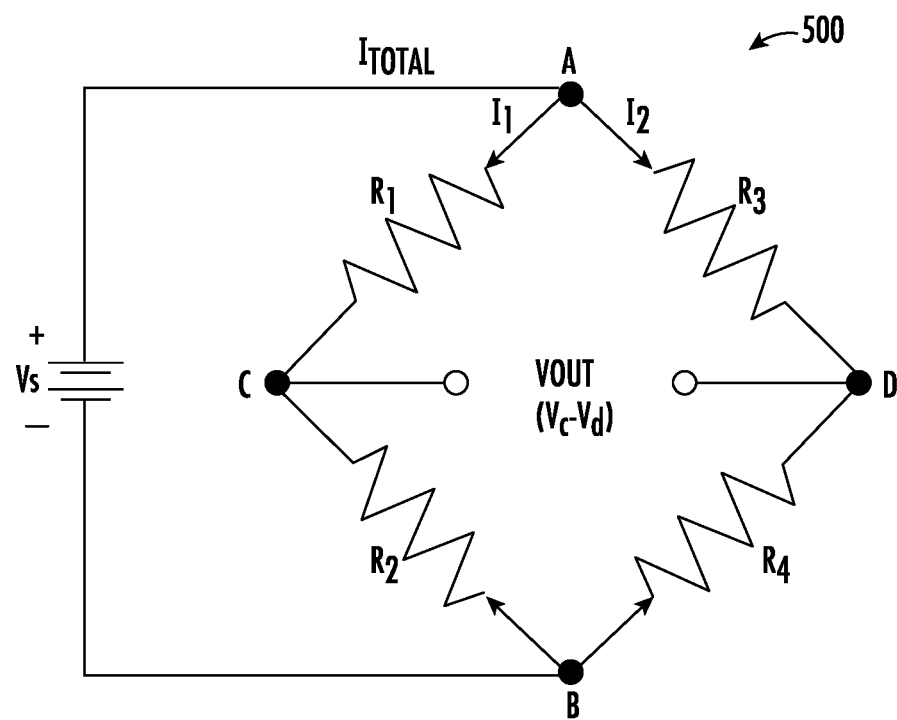
FIG. 5 illustrates an example circuit diagram associated with an example pressure sensing element in accordance with various embodiments of the present disclosure.

In some embodiments, when the outer surface 410 of the diaphragm 404 is in contact with gaseous substance and/or liquid substance whose pressure is to be detected, sensed, and/or measured, the gaseous substance and/or liquid substance exerts pressure on outer surface 410 of the diaphragm 404, and the diaphragm 404 flexes away from the pressure (for example, towards the cavity 408), causing strain in the plurality of piezoresistors (for example, four piezoresistors including the piezoresistor 406A and the piezoresistor 406B) that are embedded on the diaphragm 404. In some embodiments, the four piezoresistors are electrically coupled to an electrical circuit (such as a Wheatstone bridge circuit). Referring now to FIG. 5, an example circuit diagram associated with an example pressure sensing element in accordance with various embodiments of the present disclosure is illustrated.

In the example shown in FIG. 5, the four piezoresistors disposed on the outer surface of the diaphragm of the pressure sensing element are represented as $R_1$, $R_2$, $R_3$, and $R_4$. In some embodiments, $R_1$, $R_2$, $R_3$, and $R_4$ are electrically coupled to a Wheatstone bridge circuit. In particular, $R_1$ and $R_2$ may be electrically coupled to a first bridge branch of the Wheatstone bridge circuit between point A and point B as shown in FIG. 5, and $R_3$ and $R_4$ may be electrically coupled to a second bridge branch of the Wheatstone bridge circuit between point A and point B as shown in FIG. 5.

As described above, when pressure is applied on the outer surface of the diaphragm (for example, by gaseous substance and/or liquid substance whose pressure is to be detected, sensed, and/or measured), the piezoresistors $R_1$, $R_2$, $R_3$, and/or $R_4$ can be strained, which can cause one or more changes in one or more electrical resistances of $R_1$, $R_2$, $R_3$, and/or $R_4$. As shown in the example circuit diagram 500 illustrated in FIG. 5, a bias voltage $V_s$ can be applied to the Wheatstone bridge circuit between point A and point B. Because of the one or more changes in one or more electrical resistances of $R_1$, $R_2$, $R_3$, and/or $R_4$, the voltage difference $V_{out}$ between voltage $V_c$ at point C of the Wheatstone bridge circuit (which is between $R_1$ and $R_2$) and voltage $V_d$ at point D of the Wheatstone bridge circuit (which is between $R_3$ and $R_4$) may change. In some embodiments, the change in the voltage difference $V_{out}$ corresponds to the pressure received on the outer surface of the diaphragm and exerted by the gaseous substance and/or liquid substance. As such, an example pressure sensing element in the form of an example MEMS piezoresistive pressure sensor die detects, senses, and/or measures the pressure of gaseous substance and/or liquid substance by generating an electrical signal corresponding to the voltage difference $V_{out}$.

While the description above provides an example of a pressure sensing element in the form of an example MEMS piezoresistive pressure sensor die in accordance with various embodiments of the present disclosure, it is noted that the scope of the present disclosure is not limited to the description above. In some examples, an example pressure sensing element may comprise one or more additional and/or alternative components, may be in one or more different forms, and/or may measure one or more different types of pressure.

For example, in some embodiments, an example pressure sensing element in accordance with example embodiments of the present disclosure is in the form of a MEMS capacitive pressure sensor. Additionally, or alternatively, in some embodiments, an example pressure sensing element in accordance with example embodiments of the present disclosure is in the form of a potentiometric pressure sensor. Additionally, or alternatively, in some embodiments, an example pressure sensing element in accordance with example embodiments of the present disclosure is in the form of an inductive pressure sensor. Additionally, or alternatively, in some embodiments, an example pressure sensing element in accordance with example embodiments of the present disclosure is in the form of a variable reluctance pressure sensor. Additionally, or alternatively, in some embodiments, an example pressure sensing element in accordance with example embodiments of the present disclosure is in the form of an absolute pressure sensor. Additionally, or alternatively, in some embodiments, an example pressure sensing element in accordance with example embodiments of the present disclosure is in the form of a gauge sensor. Additionally, or alternatively, in some embodiments, an example pressure sensing element in accordance with example embodiments of the present disclosure is in the form of a differential pressure sensor.

The term "temperature sensing element" in the present disclosure refers to an element that detects, senses, and/or measures the temperature of gaseous substance and/or liquid substance. In some embodiments, the temperature sensing element converts detected temperature into an analogues electrical signal.

For example, an example temperature sensing element in accordance with various embodiments of the present disclosure is an example diode (for example, but not limited to, an example P-N junction diode, an example Zt diode). When a constant current is applied to the example diode, the voltage across the example diode (for example, the voltage between the P-N junction) is affected by the temperature of the environment that the example diode is in. As an example, when the example diode is in contact with (or through insulator media that is in contact with) the gaseous substance and/or liquid substance whose temperate is to be detected, sensed, and/or measured, the temperature of the gaseous substance and/or liquid substance may affect the voltage across the example diode. In some embodiments, when the temperature increases, the voltage across the example diode decreases. In some embodiments, when the temperature decreases, the voltage across the example diode increases.

In some embodiments, the example diode may have a temperature coefficient between 1 mV/° C. and 2 mV/° C. In some embodiments, the example diode may have a temperature coefficient of 2 mV/° C. For example, when the example diode has a temperature coefficient of 2 mV/° C., the voltage across the example diode decreases by 2 mV when the temperature of the gaseous substance and/or liquid substance increases by 1° C. In some embodiments, the example diode may have a temperature coefficient of other value(s) and/or within other range(s).

As such, an example temperature sensing element in the form of an example diode detects, senses, and/or measures the temperature of gaseous substance and/or liquid substance by generating an electrical signal corresponding to the voltage across the diode.

While the description above provides an example of a temperature sensing element in the form of an example diode in accordance with various embodiments of the present disclosure, it is noted that the scope of the present disclosure is not limited to the description above. In some examples, an example temperature sensing element may comprise one or more additional and/or alternative components, may be in one or more different forms, and/or may measure one or more different types of temperature.

For example, in some embodiments, an example temperature sensing element in accordance with example embodiments of the present disclosure is in the form of a thermocouple. Additionally, or alternatively, in some embodiments, an example temperature sensing element in accordance with example embodiments of the present disclosure is in the form of a resistance temperature detector (RTD). Additionally, or alternatively, in some embodiments, an example temperature sensing element in accordance with example embodiments of the present disclosure is in the form of a thermistor. Additionally, or alternatively, in some embodiments, an example temperature sensing element in accordance with various embodiments of the present disclosure is a MEMS temperature sensing die that is built and packaged using MEMS techniques.

The term "signal conditioning element" in the present disclosure refers to an element that adjusts, manipulates, and/or otherwise conditions an analogues signal (such as an analogues electrical signal) so that the analogues signal meets certain processing requirements of electronic system. In some embodiments, an example signal conditioning element in accordance with various embodiments of the present disclosure may be an example Application Specific Integrated Circuit (ASIC). In some embodiments, the example ASIC may include one or more microprocessors electrically coupled to one or more memory units (such as, but not limited to, random-access memory (RAM), read-only memory (ROM), flash memory, and/or the like). In some embodiments, the one or more microprocessors of the example ASIC adjust, manipulate, and/or otherwise condition an analogues signal, and output the adjusted/manipulated/conditioned signal to the electronic system.

While the description above provides an example of a signal conditioning element, it is noted that the scope of the present disclosure is not limited to the description above. In some examples, an example signal conditioning element may comprise one or more additional and/or alternative components and/or may be in one or more different forms. For example, in some embodiments, an example signal conditioning element in accordance with example embodiments of the present disclosure is in the form of an analog-to-digital converter (ADC). The example ADC converts an analogues signal (such as an analogues electrical signal) into a digital signal.

The term "signal amplifying element" in the present disclosure refers to an element that increases, expands, and/or otherwise amplifies a signal (such as, but not limited to, an analogues electrical signal). In some embodiments, an example signal amplifying element in accordance with various embodiments of the present disclosure may be an example instrumentation amplifier (INA). In such embodiments, the example INA comprises three operational amplifiers, where a non-inverting amplifier is connected to each input of a differential amplifier.

While the description above provides an example of a signal amplifying element, it is noted that the scope of the present disclosure is not limited to the description above. In some examples, an example signal amplifying element may comprise one or more additional and/or alternative components, and/or may be in one or more different forms.

The term "resistor element" in the present disclosure refers to an element that creates electrical resistance in the flow of electric current. In some embodiments, an example resistor element in accordance with example embodiments of the present disclosure is an example resistor. In such an example, the example resistor may reduce electric current flow, divide electrical voltage, adjust electrical signal levels, and/or the like.

While the description above provides an example of a resistor element, it is noted that the scope of the present disclosure is not limited to the description above. In some examples, an example resistor element may comprise one or more additional and/or alternative components and/or may be in one or more different forms.

The term "circuit board element" in the present disclosure refers to an element that mechanically supports and electrically connects electrical components or electronic components, including but not limited to, pressure sensing element(s), temperature sensing element(s), signal conditioning element(s), signal amplifying element(s), resistor element(s), terminal connector element(s), power source(s), and/or the like. In some embodiments, an example circuit board element may be in the form of an example printed circuit board (PCB). In such an example, the example PCB may comprise a non-conductive substrate and conductive tracks, pads and other features that are formed and/or printed on the non-conductive substrate (for example, through a chemical etching process).

In some embodiments, one or more other elements (such as, but not limited to, pressure sensing element(s), temperature sensing element(s), signal conditioning element(s), signal amplifying element(s), resistor element(s), terminal connector element(s), power source(s), and/or the like) are installed (for example, through a soldering process) onto the example PCB so that each of these elements is electrically coupled to one or more other elements and mechanically fastened onto the example PCB. In the present disclosure, an example PCB is also referred to as a printed circuit board assembly (PCBA).

While the description above provides an example of a circuit board element, it is noted that the scope of the present disclosure is not limited to the description above. In some examples, an example circuit board element may comprise one or more additional and/or alternative components and/or may be in one or more different forms.

The term "terminal connector element" in the present disclosure refers to an element that mechanically and/or electrically connects one circuit board element with another circuit board element. For example, an example terminal connector element in accordance with example embodiments of the present disclosure is in the form of an example electrical connector (such as, but not limited to, an example metri-pack connector). In such an example, the example electrical connection may comprise material such as, but not limited to, copper alloys, brass, nickel, and/or the like.

While the description above provides an example of a terminal connector element, it is noted that the scope of the present disclosure is not limited to the description above. In some examples, an example terminal connector element may comprise one or more additional and/or alternative components, and/or may be in one or more different forms.

The term "member" in the present disclosure refers to a mechanical and physical structure or unit can be used to form, construct, or otherwise be part of an apparatus, a machine, a device, and/or the like. Example members in the present disclosure include, but not limited to, sleeve member, bellows member, sealing member, header member, and/or the like. The structural details and features of these members are described and illustrated in connection with various drawings of the present disclosure.

As described above, there are many technical deficiencies and problems associated with sensors. For example, in many applications such as, but not limited to, electric vehicles, refrigeration systems, compressor systems, pumping systems, and/or the like, there is a need for a single sensing solution that detects, senses, and/or measures both pressure and temperature together in the same package in order to satisfy, for example, regulatory requirements, efficiency goals, and/or other objectives.

As an example, one of the key challenges in plug-in electric vehicle (PEV) is the time required for charging the battery cells/packs of the PEV and the availability of power outlets/chargers that provide sufficient capabilities in charging the battery cells/packs. The Society of Automotive Engineers classified charging stations/power outlets/chargers for PEVs into three levels: level 1, level 2 and level 3.

A level 1 charging station/power outlet/charger uses a standard 120 V alternating current (AC) electric circuit. The typical charging time for charging a PEV by a level 1 charging station/power outlet/charger is approximately 8 to 10 hours (depending on the model of the PEV), and provides approximately 2 to 5 miles of range per hour of charging.

A level 2 charging station/power outlet/charger uses a 240 V (for residential) or 208 V (for commercial) AC electric circuit. The typical charging time for charging a PEV by a level 2 charging station/power outlet/charger is approximately 4 to 8 hours (depending on the model of the PEV), and provides approximately 10-20 miles of range per hour of charging.

A level 3 (or direct current (DC) fast charge) charging station/power outlet/charger uses a 480 V AC electric circuit, and converts the AC into DC. The typical charging time for charging a PEV by a level 3 charging station/power outlet/charger is approximately 30 to 60 minutes (depending on the model of the PEV), and provides approximately 60-80 miles of range per hour of charging.

As illustrated in the different charging times of a level 1 charging station/power outlet/charger, a level 2 charging station/power outlet/charger, and a level 3 charging station/power outlet/charger, higher power decreases charging time and makes charging a PEV faster. However, providing higher power to a PEV also generates more heat in the charging station/power outlet/charger, onboard battery cells/packs of the PEV, and/or charging cables. For example, extreme fast chargers can push the temperature of battery cells/packs in a PEV to 270° C. or 514° F. after just a few minutes of charging. The heat generated from charging requires advanced cooling techniques to promote safe and reliable operation.

Due to the limitations of air-cooling solutions, liquid cooling solutions can be implemented in EV and PEV for enabling efficient performance and safe operations of onboard battery cells/packs, charging cables, and/or and other key EV components, such that they can handle the increased heat as the charging power increases.

For example, a PEV may use an onboard converter to manage the power flow from the charging station/power outlet/charger to the onboard battery cells/packs. When a level 3 charging station/power outlet/charger is implemented to charge a PEV, the onboard converter require efficient thermal management through, for example, liquid cooling solutions. As another example, onboard vehicle battery cells/packs must be thermally managed during charging and operation to maximize their life and performance, and liquid cooling solutions may provide the needed thermal management. As another example, implementing liquid cooling solutions in a charging cable may reduce the weight of the charging cable so that it is easier for consumers to handle.

Example liquid cooling solutions in an EV may be in various forms that all require a liquid coolant. For example, an example liquid cooling solution may be in the form of an example indirect cooling system that may comprise a series of pipes in the onboard converter, onboard battery cells/packs, charging cables, and/or and other key EV components, and the series of pipes may circulate liquid coolant. The liquid coolant absorbs excess heat and carries it away to, for example, a heat exchanger. Example liquid coolant in an example indirect cooling system may include, but not limited to, water, glycol (such as, but not limited to, ethylene glycol, propylene glycol), glycol-water mix, polyalphaolefin, fluorocarbon, and/or the like. As another example, an example liquid cooling solution may be in the form of an example direct cooling system, where liquid coolant is in direct contact with the onboard converter, onboard battery cells/packs, charging cables, and/or and other key EV components. In such an example, the liquid coolant may comprise electrically insulating but thermally conductive material, such as, but not limited to, deionized water, mineral oil, fluorocarbon, synthetic, and/or the like.

In various implementations of liquid cooling solutions, the pressure and temperature of the liquid coolant needs to be measured and monitored. Many liquid cooling solutions provide separate pressure sensors and temperature sensors, which are cost prohibitive and can add more weight to the EV/PEV, and manufacturers are in need of a compact sensor package. Using separate pressure sensors and temperature sensors not only requires more space but also impacts the accuracy of readings. Further, many liquid cooling solutions fail to provide sufficient isolation of the pressure sensors and the temperature sensors from the liquid coolant, which can be corrosive and cause damages to the pressure sensors and the temperature sensor.

Various embodiments of the present disclosure may overcome various technical deficiencies and problems, including but not limited to those described above. For example, an example apparatus for sensing pressure and temperature in accordance with example embodiments of the present disclosure may comprise a media isolation chamber assembly that comprises a bellows member housing various sensing elements and functioning similar to a diaphragm. Insulator media (such as, but not limited to, silicon oil) may be filled with in the bellows member so that the sensing elements are isolated from corrosive and/or wet media. In some embodiments, a temperature sensing element may be positioned within and at the end of the media isolation chamber assembly, so that it can provide precise reading of temperature associated with the fluid substance to be measured. In some embodiments, a pressure sensing element (such as, but not limited to, a MEMS pressure sensor) and the temperature sensing element may be installed on a circuit board element (such as, but not limited to, a PCBA) that is disposed within the media isolation chamber assembly, and the circuit board element may carry other elements such as, but not limited to, signal conditioning element(s) (such as, but not limited to, ASICs), signal amplifying element(s) and/or the like. In some embodiments, the circuit board element is connected to (for example, through soldering) to a terminal connector element and provides electrical signals to another circuit board element, which in turn provides electrical signals to another terminal connector element that extends outside the example apparatus. Further, example embodiments of the present disclosure provide a compact design of an electric circuit that provides separate outputs, one corresponding to detected pressure and another corresponding to detected temperature, details of which are described herein.

As such, example embodiments of the present disclosure may provide a compact design that causes less thermal loss and improves accuracy of the pressure and temperature measurement, and/or may isolate sensing elements from corrosive and/or wet media to protect the sensing elements, details of which are described herein.

While the description provided herein illustrates implementing example embodiments of the present disclosure in electric vehicle charging applications, it is noted that the scope of the present disclosure is not limited to these applications. In some examples, example embodiments of the present disclosure may be implemented in other applications/environments/systems, including, but not limited to, refrigeration systems, compressor systems, pumping systems, and/or the like.

Figure 1B:
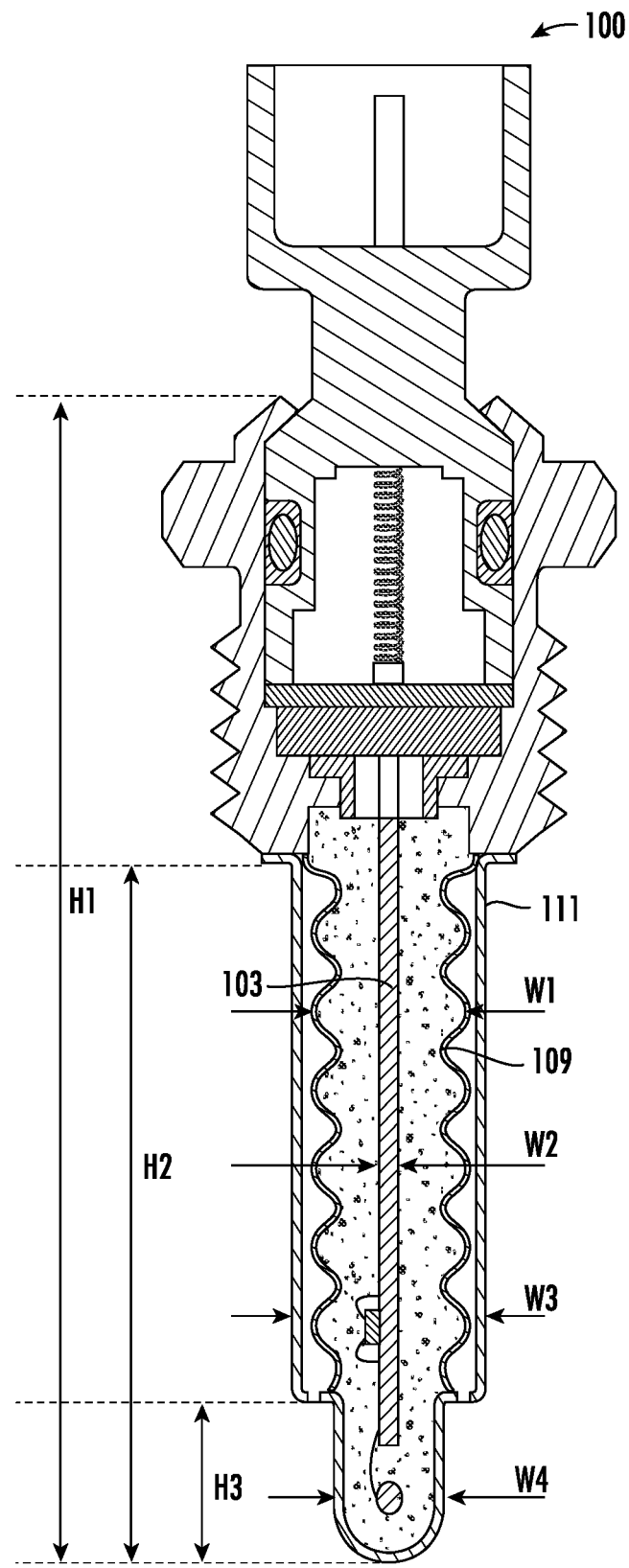
FIG. 1B illustrates an example cross-sectional side view of an example apparatus for sensing pressure and temperature in accordance with various embodiments of the present disclosure.

Referring now to FIG. 1A and FIG. 1B, an example apparatus 100 for sensing pressure and temperature in accordance with various embodiments of the present disclosure is illustrated. In particular, FIG. 1A illustrates an example cross-sectional front view of the example apparatus 100. FIG. 1B illustrates an example cross-sectional side view of the example apparatus 100 along the cut line A-A' and viewing in the direction of the arrows in FIG. 1A.

In the example shown in FIG. 1A, the example apparatus 100 comprises at least an example media isolation chamber assembly 101, a first example circuit board element 103, an example pressure sensing element 105, and an example temperature sensing element 107.

In some embodiments, the example media isolation chamber assembly 101 comprises an example bellows member 109 and an example sleeve member 111.

In some embodiments, the example sleeve member 111 is in a shape similar to a hollow cylindrical shape. For example, the example sleeve member 111 is in a shape similar to a right cylinder shape. In some embodiments, the example sleeve member 111 comprises an example body portion 113 having an example side section 115 and an example end section 117.

In some embodiments, the example side section 115 of the example body portion 113 may be formed based on the points on the example side section 115 having a fixed distance from a central axis of the example sleeve member 111. As described above, the example sleeve member 111 may be in a shape similar to a hollow cylindrical shape, and the central axis of the example sleeve member 111 may correspond to the central axis of the hollow cylindrical shape.

In some embodiments, the example end section 117 of the example body portion 113 may be formed based on the example end section 117 being in a parapedicular arrangement with the example side section 115. As described above, the example sleeve member 111 may be in a shape similar to a hollow cylindrical shape, and the example end section 117 may correspond to an example end plane of the hollow cylindrical shape.

In the example shown in FIG. 1A, the example sleeve member 111 also comprises an example probe portion 119. In some embodiments, the example probe portion 119 protrudes from an example outer surface of the example end section 117 of the example body portion 113 of the example sleeve member 111. In the example shown in FIG. 1A, the example probe portion 119 may be in a shape similar to a half-capsule shape that comprises a cylinder-shaped portion and a hemispherical end portion.

In some embodiments, the example probe portion 119 of the example sleeve member 111 is connected to the example body portion 113. For example, the example probe portion 119 may be formed on the example end section 117 of the example body portion 113.

In some embodiments, the example sleeve member 111 may comprise material such as, but not limited to, stainless steel, beryllium copper, phosphor bronze, metal alloys, and/or the like. In some embodiments, the example sleeve member 111 may comprise other material(s). In some embodiments, the example sleeve member 111 may be formed through, for example but not limited to, a deep drawing process.

While the description above provides an example of a sleeve member, it is noted that the scope of the present disclosure is not limited to the description above. In some examples, an example sleeve member may comprise one or more additional and/or alternative elements, and/or may be in other shapes/forms. For example, an example body portion of an example sleeve member may be in shapes other than a hollow cylindrical shape, such as, but not limited to, a cube shape, a sphere shape, a prism shape, a cone shape, a pyramid shape, and/or the like. Additionally, or alternatively, an example probe portion of an example sleeve member may be in shapes other than a half-capsule shape, such as, but not limited to, a cube shape, a sphere shape, a prism shape, a cone shape, a pyramid shape, and/or the like.

Referring back to the example shown in FIG. 1A, as described above, the example media isolation chamber assembly 101 may comprise the example bellows member 109. In some embodiments, the example bellows member 109 acts as a diaphragm. In some embodiments, the example bellows member 109 may be in the form of an elastic tube/tubing that can be compressed when pressure is applied to the outer surface of the elastic tube/tubing, and/or may be extended when pressure that has been applied to the outer surface of the elastic tube/tubing is removed.

For example, the example bellows member 109 may be in the form of a tube or tubing in a hollow cylindrical shape. In this example, the side section of the example bellows member 109 is corrugated and comprises alternating ridges and grooves. When pressure is applied to the side section of the example bellows member 109, the example bellows member 109 may be compressed. When pressure that has been applied to the side section of the example bellows member 109 is removed, the example bellows member 109 may be extended.

In some embodiments, the example bellows member 109 may comprise material such as, but not limited to, stainless steel, beryllium copper, phosphor bronze, metal alloys, and/or the like. In some embodiments, the example bellows member 109 may comprise other material(s).

In some embodiments, the example bellows member 109 may be formed through a welding process. For example, a number of individually formed diagrams may be welded together to form alternating ridges and grooves of the example bellows member 109. Additionally, or alternatively, an example bellows member 109 may be formed through a hydroforming process. Additionally, or alternatively, an example bellows member 109 may be formed through a deep drawing process. Additionally, or alternatively, an example bellows member 109 may be formed through an electroforming process. Additionally, or alternatively, an example bellows member 109 may be formed through other manufacturing process(es).

In some embodiments, the example bellows member 109 is disposed in the example sleeve member 111. For example, as described above, the example bellows member 109 may be in a shape similar to a hollow cylindrical shape, and the example sleeve member 111 may be in a shape similar to a hollow cylindrical shape. In some embodiments, the example bellows member 109 is positioned within the example sleeve member 111, and the central axis of the example bellows member 109 is in a parallel arrangement with the central axis of the example sleeve member 111.

In some embodiments, the example bellows member 109 is disposed in the example body portion 113 of the example sleeve member 111. In some embodiments, the example bellows member 109 is hermetically sealed to the example body portion 113 of the example sleeve member 111. For example, an end edge of the example bellows member 109 is hermetically sealed to the example end section 117 of the example body portion 113 of the example sleeve member 111, so that liquid substance and gaseous substance do not travel into the example bellows member 109 through the example sleeve member 111.

In some embodiments, the example bellows member 109 is hermetically sealed to the example sleeve member 111 through a welding process using laser. In some embodiments, the example bellows member 109 is hermetically sealed to the example sleeve member 111 through other process(es).

In some embodiments, the example sleeve member 111 comprises at least one media opening on its surface. In the example shown in FIG. 1A, the example end section 117 of the example probe portion 119 of the example sleeve member 111 comprises a media opening 120A and a media opening 120B. In some embodiments, the media opening 120A and the media opening 120B may be formed through a deep drawing process. In some embodiments, the media opening 120A and the media opening 120B may be formed through other manufacturing process(es).

In some embodiments, the media opening(s) on the example end section 117 of the example probe portion 119 of the example sleeve member 111 is configured to receive a liquid substance, and the pressure of the liquid substance is to be detected by the example apparatus 100. For example, the liquid substance may enter the example sleeve member 111 through the at least one media opening and fill the cavity formed between outer surface of the example bellows member 109 and the example body portion 113 of the example sleeve member 111 (e.g. the inner surface opposite to the example side section 115). The liquid substance may be in contact with the outer surface of the example bellows member 109, but does not enter the example bellows member 109 because the example bellows member 109 is hermetically sealed to the example sleeve member 111.

In some embodiments, the example bellows member 109 houses or otherwise contains insulator media. In some embodiments, the insulator media comprises electrically insulating but thermally conductive material. Examples of insulator media may include, but not limited to, silicon oil, mineral oil, fluorocarbon, synthetic, and/or the like.

Referring back to the example shown in FIG. 1A, as described above, the example apparatus 100 comprises the first example circuit board element 103. As described above, the first example circuit board element 103 may be in the form of an example PCB. In such an example, the first example circuit board element 103 comprises a non-conductive substrate and conductive tracks, pads and other features that are formed on the non-conductive substrate (for example, through a chemical etching process).

In some embodiments, one or more other elements (such as, but not limited to, pressure sensing element(s), temperature sensing element(s), signal conditioning element(s), signal amplifying element(s), resistor element(s), terminal connector element(s), power source(s), and/or the like) are installed (for example, through a soldering process) onto the first example circuit board element 103 so that each of these elements is electrically coupled to one or more other elements and mechanically fastened onto the first example circuit board element 103. For example, the example pressure sensing element 105 and/or example temperature sensing element 107 are installed on the first example circuit board element 103. In some embodiments, one or more signal conditioning element(s) and/or signal amplifying element(s) are installed on the first example circuit board element 103. Similar to those described above, the first example circuit board element 103 with elements installed is also referred to as a first example PCBA.

In the example shown in FIG. 1A, the first example circuit board element 103 is disposed in the example bellows member 109. In some embodiments, the first example circuit board element 103 extends from within the example bellows member 109 to within the example probe portion 119 of the example sleeve member 111. In some embodiments, an edge of the first example circuit board element 103 is secured to an inner surface of the example probe portion 119 of the example sleeve member 111 through, for example but not limited to, a welding process.

In some embodiments, the first example circuit board element 103 is encapsulated by the insulator media. In some embodiments, the first example circuit board element 103 is completely submerged within the insulator media (such as, but not limited to, silicon oil). In some embodiments, the first example circuit board element 103 is partially submerged within the insulator media (such as, but not limited to, silicon oil). In some embodiments, the insulator media and the example bellows member 109 protect the first example circuit board element 103 (as well as other elements electrically coupled to the first example circuit board element 103) from corrosive and wet media (for example, the liquid substance entering through the media opening 120A and media opening 120B as described above).

Referring back to the example shown in FIG. 1A, as described above, the example apparatus 100 comprises the example pressure sensing element 105. As described above, the example pressure sensing element 105 detects, senses, and/or measures the pressure of gaseous substance and/or liquid substance. In some embodiments, the example pressure sensing element 105 in accordance with various embodiments of the present disclosure is a MEMS pressure sensing die that is built and packaged using MEMS techniques, similar to those described above and illustrated in connection with FIG. 4 and FIG. 5.

Additionally, or alternatively, in some embodiments, the example pressure sensing element 105 in accordance with example embodiments of the present disclosure is in the form of a MEMS capacitive pressure sensor. Additionally, or alternatively, in some embodiments, the example pressure sensing element 105 in accordance with example embodiments of the present disclosure is in the form of a potentiometric pressure sensor. Additionally, or alternatively, in some embodiments, the example pressure sensing element 105 in accordance with example embodiments of the present disclosure is in the form of an inductive pressure sensor. Additionally, or alternatively, in some embodiments, the example pressure sensing element 105 in accordance with example embodiments of the present disclosure is in the form of a variable reluctance pressure sensor. Additionally, or alternatively, in some embodiments, an example pressure sensing element may comprise one or more additional and/or alternative components and/or may be in one or more different form(s).

As described above, the example pressure sensing element 105 is disposed in the example bellows member 109 and submerged in and/or encapsulated by the insulator media. As described above, liquid substance (whose pressure is to be measured by the apparatus 100) may enter the cavity between the example bellows member 109 and the example sleeve member 111 through the media opening 120A and/or the media opening 120B, and the liquid substance is in contact with outer surface of the example bellows member 109. Further, as described above, the example bellows member 109 acts as a diaphragm. For example, the example bellows member 109 may be in the form of an elastic tube/tubing that can be compressed when pressure is applied to the outer surface of the elastic tube/tubing. As such, the pressure from the liquid substance may be transferred to the example bellows member 109 as the liquid substance enters through the media opening 120A and/or the media opening 120B. In some embodiments, the example bellows member 109 houses insulator media (such as silicon oil), and the pressure may be transferred through the insulator media (such as silicon oil) to the example pressure sensing element 105. In some embodiments, the example pressure sensing element 105 generates an electrical signal that corresponds to the pressure of the liquid substance.

In various embodiments of the present disclosure, an example pressure sensing element 105 measures one or more different types of pressure. For example, the example pressure sensing element 105 in accordance with example embodiments of the present disclosure measures an absolute pressure of the liquid substance relative to a reference of zero pressure. Additionally, or alternatively, the example pressure sensing element 105 in accordance with example embodiments of the present disclosure measures a pressure relative to the atmospheric pressure. Additionally, or alternatively, the example pressure sensing element 105 in accordance with example embodiments of the present disclosure measures a pressure between two points in the flow of the liquid sub stance.

Referring back to the example shown in FIG. 1A, the example pressure sensing element 105 is electrically coupled to the first example circuit board element 103. In such an example, the example pressure sensing element 105 provides the electrical signal that corresponds to the pressure of the liquid substance to other elements of the example apparatus 100, details of which are described herein.

As described above, the example apparatus 100 comprises the example temperature sensing element 107. The example temperature sensing element 107 detects, senses, and/or measures the temperature of gaseous substance and/or liquid substance. In some embodiments, the example temperature sensing element 107 in accordance with various embodiments of the present disclosure is an example diode (for example, but not limited to, an example P-N junction diode), similar to those described above. Additionally, or alternatively, the example temperature sensing element 107 in accordance with example embodiments of the present disclosure is in the form of a thermocouple. Additionally, or alternatively, the example temperature sensing element 107 in accordance with example embodiments of the present disclosure is in the form of a resistance temperature detector (RTD). Additionally, or alternatively, the example temperature sensing element 107 in accordance with example embodiments of the present disclosure is the form of a thermistor. Additionally, or alternatively, the example temperature sensing element 107 in accordance with various embodiments of the present disclosure is a MEMS temperature sensing die that is built and packaged using MEMS techniques.

In some embodiments, the example temperature sensing element 107 is disposed in the example sleeve member 111. In the example shown in FIG. 1A, the example temperature sensing element 107 is disposed in the example probe portion 119 of the example sleeve member 111. As the example bellows member 109 is disposed in and hermetically sealed to the example body portion 113 of the example sleeve member 111, the example probe portion 119 of the example sleeve member 111 is connected to the example bellows member 109, and both the example bellows member 109 and the example probe portion 119 of the example sleeve member 111 house or otherwise contain isolation media. As such, the example temperature sensing element 107 is submerged in and/or encapsulated by the insulator media (such as silicon oil).

In some embodiments, liquid substance (whose temperature is to be measured) is in contact with the example probe portion 119 of the example sleeve member 111. Because the example temperature sensing element 107 is disposed in the example probe portion 119 of the example sleeve member 111, the example temperature sensing element 107 generates an electrical signal that corresponds to the temperature of the liquid substance.

Referring back to the example shown in FIG. 1A, the example temperature sensing element 107 is electrically coupled to the first example circuit board element 103. In such an example, the example temperature sensing element 107 provides an electrical signal that corresponds to the temperature of the liquid substance to other elements of the example apparatus 100, details of which are described herein.

While the description above provides examples of pressure sensing elements and temperature sensing elements, it is noted that the scope of the present disclosure is not limited to the description above. In some examples, a sensing element provides capability to measure both pressure and temperature (for example, a MEMS pressure sensing die having temperature measure options using a Zt diode), such that separate pressure sensing element and temperature sensing element are not needed. In such examples, the sensing element is positioned corresponding to the position of the example pressure sensing element 105 illustrated in FIG. 1A or corresponding to the position of the example temperature sensing element 107 illustrated in FIG. 1A. An example apparatus comprising such an example sensing element is illustrated and described in connection with at least FIG. 2A, FIG. 2B, and FIG. 2C.

Referring back to FIG. 1A, the example apparatus 100 comprises an example port assembly 121. In some embodiments, the example media isolation chamber assembly 101 is secured to the example port assembly 121. For example, an edge of the example sleeve member 111 of the example media isolation chamber assembly 101 is secured to an outer surface 123 of the example port assembly 121 through, for example but not limited to, a welding process. Additionally, or alternatively, an edge of the example bellows member 109 of the example media isolation chamber assembly 101 is secured to the outer surface 123 of the example port assembly 121 through, for example but not limited to, a welding process.

In the example shown in FIG. 1A, the example port assembly 121 comprises an example tunnel 125 that connects an example first opening 127 on the example outer surface 123 of the example port assembly 121 to an example second opening 129 on an inner surface of the example port assembly 121. In such an example, the example tunnel 125 is configured to convey the insulator media (such as, but not limited to, silicon oil) to the example bellows member 109 of the example media isolation chamber assembly 101 (as well as the example probe portion 119 of the example sleeve member 111) through the example first opening 127 on the example outer surface 123 of the example port assembly 121.

For example, to inject the insulator media to the example bellows member 109 of the example media isolation chamber assembly 101 and the example probe portion 119 of the example sleeve member 111, the insulator media is provided to the example second opening 129 on the inner surface of the example port assembly 121. The insulator media enters the example tunnel 125 through the example second opening 129, travels through the example tunnel 125, and egresses the example tunnel 125 through the example first opening 127. In some embodiments, the example first opening 127 is position within the example bellows member 109. As such, the insulator media is provided to the example bellows member 109. Because the example probe portion 119 of the example sleeve member 111 is connected to the example bellows member 109, the insulator media is provided to example probe portion 119 of the example sleeve member 111 through the bellows member 109. Additionally, or alternatively, when pressure is exerted on the example bellows member 109, the insulator media disposed within the example bellows member 109 is pushed through the example tunnel 125.

Referring back to the example shown in FIG. 1A, in some embodiments, the example apparatus 100 also comprises an example sealing member 131 (for example, a sealing ball) that covers the example second opening 129. For example, once the example bellows member 109 and the example probe portion 119 of the example sleeve member 111 are filled with insulator media, the example sealing member 131 is positioned on the example second opening 129 to seal the example tunnel 125, such that the insulator media does not leak from the example bellows member 109 or the example probe portion 119 through the example tunnel 125.

In some embodiments, the example apparatus 100 comprises a second example circuit board element 133.

As described above, the second example circuit board element 133 may be in the form of an example PCB. In such an example, the second example circuit board element 133 comprises a non-conductive substrate and conductive tracks, pads and other features that are formed on the non-conductive substrate (for example, through a chemical etching process).

In some embodiments, one or more other elements (such as, but not limited to, pressure sensing element(s), temperature sensing element(s), signal conditioning element(s), signal amplifying element(s), resistor element(s), terminal connector element(s), power source(s), and/or the like) are installed (for example, through a soldering process) onto the second example circuit board element 133 so that each of these elements is electrically coupled to one or more other elements and mechanically fastened onto the second example circuit board element 133. For example, an example signal conditioning element and an example signal amplifying element is installed on the second example circuit board element 133. Similar to those described above, the second example circuit board element 133 with elements installed is also referred to as a second example PCBA.

In some embodiments, the second example circuit board element 133 is disposed within the example port assembly 121. In some embodiments, the example apparatus 100 comprises at least one terminal connector element (for example, a first example terminal connector element 135A and a second example terminal connector element 135B) that electrically couples the second example circuit board element 133 with the first example circuit board element 103. For example, various electrical signals, data, and/or information are communicated between the second example circuit board element 133 and the first example circuit board element 103 through the first example terminal connector element 135A and/or the second example terminal connector element 135B. In some embodiments, one end of the at least one terminal connector element (for example, one end of the first example terminal connector element 135A and/or one end of the second example terminal connector element 135B) is secured to the second example circuit board element 133 through, for example but not limited to, a soldering process. In some embodiments, one end of the at least one terminal connector element (for example, one end of the first example terminal connector element 135A and/or one end of the second example terminal connector element 135B) is secured to first example circuit board element 103 through, for example but not limited to, a soldering process.

In the example shown in FIG. 1A, the example apparatus 100 comprises an example header member 137 secured to the first example circuit board element 103 and the example port assembly 121. In some embodiments, the example header member 137 may be in the form of a transistor outline (TO) header that provides a mechanical basis for securing and installing various elements. For example, the first example circuit board element 103 is secured to the example header member 137 through, such as but not limited to, a soldering process. In some embodiments, the example header member 137 comprises a glass-to-metal seal portion 139 that secured the first example circuit board element 103 to the example header member 137. In some embodiments, one or more of the at least one terminal connector element (for example, the first example terminal connector element 135A and/or the second example terminal connector element 135B) passes through the glass-to-metal seal portion 139. In some embodiments, the example header member 137 is secured to the example port assembly 121 through, for example but not limited to, a welding process.

In the example shown in FIG. 1A, the example port assembly 121 comprises a threaded portion 141 disposed on the outer surface of the example port assembly 121. In some embodiments, the example apparatus 100 comprises at least one connection wire 143 that electrically couples the second example circuit board element 133 to at least one example terminal connector element 145. As shown in FIG. 1A, the at least one example terminal connector element 145 extends outside of the example apparatus 100. In some embodiments, the example apparatus 100 comprises at least one environmental O-ring 147 for sealing the example header member 137 with the example port assembly 121. In some embodiments, the example apparatus 100 do not comprise O-ring or gasket.

While the description above provides an example apparatus 100 for sensing pressure and temperature, it is noted that the scope of the present disclosure is not limited to the description above. In some examples, an example apparatus for sensing pressure and temperature in accordance with examples of the present disclosure may comprise one or more additional and/or alternative elements.

Referring now to FIG. 1B, an example cross-sectional view of the example apparatus 100 along the cut line A-A' and viewing in the direction of the arrows in FIG. 1A is illustrated. In particular, FIG. 1B illustrates example measurements associated with the example apparatus 100.

As shown in FIG. 1B, the example probe portion 119 of the example sleeve member 111 has a height H3 and a width W4 (which corresponds to a diameter of the example probe portion 119). In some embodiments, the height H3 is in the range from 2 millimeters to 6 millimeters. In some embodiments, the height H3 is 4 millimeters. In some embodiments, the width W4 is in the range from 2 millimeters to 6 millimeters. In some embodiments, the width W4 is 4 millimeters.

In some embodiments, the example body portion 113 of the example sleeve member 111 has a width W3 (which corresponds to a diameter of the example body portion 113). In some embodiments, the width W3 is in the range between 6 millimeters and 10 millimeters. In some embodiments, the width W3 is 8 millimeters. In some embodiments, the thickness of the example body portion 113 of the example sleeve member 111 is in the range between 0.2 millimeters and 0.5 millimeters. In some embodiments, the thickness of the example body portion 113 is 0.25 millimeters.

In some embodiments, the example sleeve member 111 has a height H2. In some embodiments, the height H2 is in the range between 10 millimeters and 20 millimeters. In some embodiments, the height H2 is 15 millimeters.

In some embodiments, the example bellows member 109 has a width W1 (which corresponds to a diameter of the example bellows member 109). In some embodiments, the width W1 is in the range between 4 millimeters and 8 millimeters. In some embodiments, the width W1 is 6 millimeters. In some embodiments, the thickness of the example bellows member 109 is in the range between 25 micrometers to 50 micrometers. In some embodiments, the thickness of the example bellows member 109 is 30 micrometers.

In some embodiments, the combined height H1 of the example media isolation chamber assembly 101 and the example port assembly 121 is in the range between 20 millimeters and 40 millimeters. In some embodiments, the height H1 is 30 millimeters.

In some embodiments, the first example circuit board element 103 has a thickness W2. In some embodiments, the thickness W2 is in the range between 0.5 millimeters and 1.5 millimeters. In some embodiments, the thickness W2 is 1.0 millimeter.

Figure 2A:
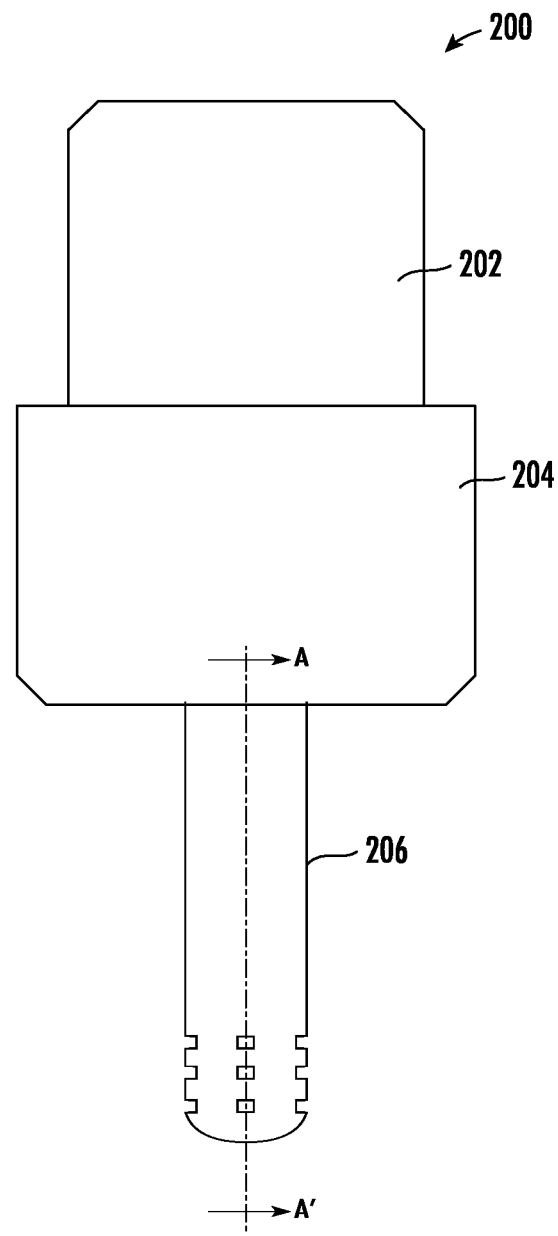
FIG. 2A illustrates an example front view of an example apparatus for sensing pressure and temperature in accordance with various embodiments of the present disclosure.
Figure 2B:
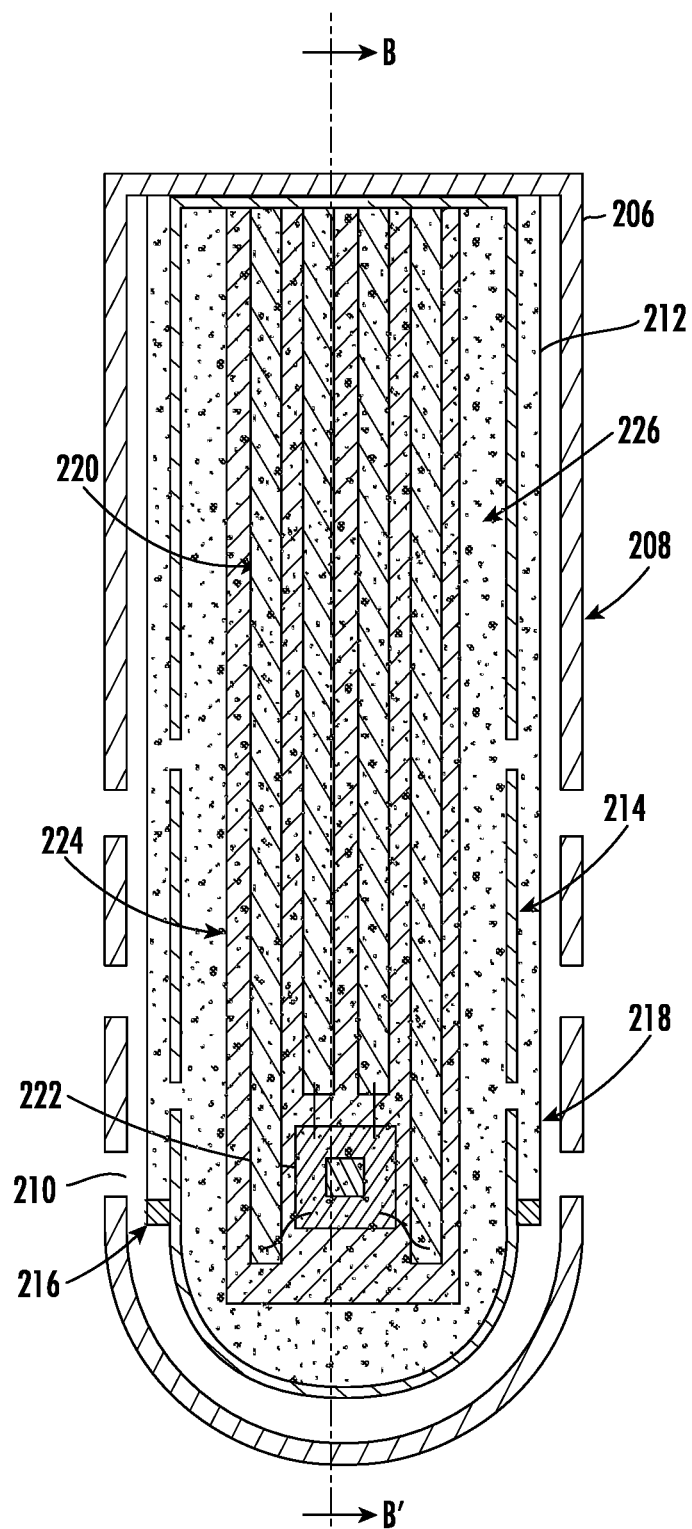
FIG. 2B illustrates an example cross-sectional view of an example media isolation chamber assembly in accordance with various embodiments of the present disclosure.
Figure 2C:
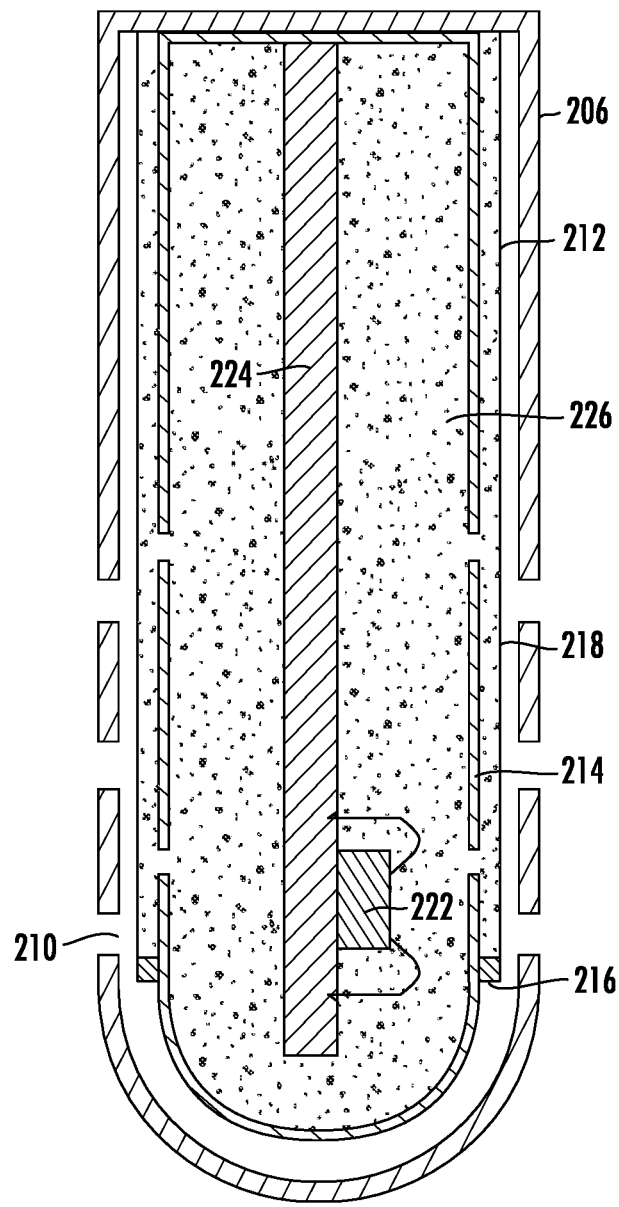
FIG. 2C illustrates an example cross-sectional view of an example media isolation chamber assembly in accordance with various embodiments of the present disclosure.

Referring now to FIG. 2A, FIG. 2B, and FIG. 2C, an example apparatus 200 for sensing pressure and temperature in accordance with various embodiments of the present disclosure is illustrated. In particular, FIG. 2A illustrates an example front view of the example apparatus 200. FIG. 2B illustrates an example cross-sectional view of an example media isolation chamber assembly 206 of the example apparatus 200 along the cut line A-A' and viewing in the direction of the arrows in FIG. 2A. FIG. 2C illustrates an example cross-sectional view of the example media isolation chamber assembly 206 of the example apparatus 200 along the cut line B-B' and viewing in the direction of the arrows in FIG. 2B.

Referring now to FIG. 2A, the example apparatus 200 comprises an example header member 202, an example port assembly 204, and an example media isolation chamber assembly 206. In some embodiments, the example header member 202 is similar to the example header member 137 described above in connection with FIG. 1A and FIG. 1B. In some embodiments, the example port assembly 204 is similar to the example port assembly 121 described above in connection with FIG. 1A and FIG. 1B. In some embodiments, the example media isolation chamber assembly 206 is similar to the example media isolation chamber assembly 101 described above in connection with FIG. 1A and FIG. 1B. For example, the example header member 202 is secured to the example port assembly 204. Additionally, or alternatively, the example media isolation chamber assembly 206 is secured to the example port assembly 204.

Referring now to FIGS. 2B and 2C, example cross-sectional views of the example media isolation chamber assembly 206 of the example apparatus 200 are illustrated.

As shown, the example media isolation chamber assembly 206 comprises an example sleeve member 208. In some embodiments, the example sleeve member 208 may be in a shape similar to a half-capsule shape that comprises a cylinder-shaped portion and a hemispherical end portion. In some embodiments, the width (which corresponds to a diameter) of the example sleeve member 208 is in the range of 2 millimeters to 6 millimeters. In some embodiments, the width of the example sleeve member 208 is 4 millimeters. In some embodiments, the thickness of the example sleeve member 208 is in the range of 0.3 millimeters to 0.7 millimeters. In some embodiments, the thickness of the example sleeve member 208 is 0.5 millimeters.

In some embodiments, the example sleeve member 208 may comprise material such as, but not limited to, stainless steel, beryllium copper, phosphor bronze, metal alloys, and/or the like. In some embodiments, the example sleeve member 208 may comprise other material(s). In some embodiments, the example sleeve member 208 may be formed through, for example but not limited to, a deep drawing process.

While the description above provides an example of a sleeve member, it is noted that the scope of the present disclosure is not limited to the description above. In some examples, an example sleeve member may comprise one or more additional and/or alternative elements, and/or may be in other shapes/forms. For example, an example sleeve member may be in shapes other than a half-capsule shape, such as, but not limited to, a cube shape, a sphere shape, a prism shape, a cone shape, a pyramid shape, and/or the like. Additionally, or alternatively, one or more measurements of the example sleeve member may be of other value(s).

In some embodiments, the example sleeve member 208 comprises at least one media opening 210 on its surface. In some embodiments, the media opening(s) of the example sleeve member 208 is configured to receive a liquid substance, and the pressure of the liquid substance is to be detected by the example apparatus 200.

In the example shown in FIG. 2B and FIG. 2C, the example media isolation chamber assembly 206 comprises an example diaphragm member 212. In some embodiments, the example diaphragm member 212 is disposed within the example sleeve member 208, and the example sleeve member 208 provides an enclosure for the example diaphragm member 212. In some embodiments, the example diaphragm member 212 comprises an example inner casing member 214. In some embodiments, the example inner casing member 214 is disposed within the example sleeve member 208. In some embodiments, the example inner casing member 214 comprises one or more openings on its surface.

In some embodiments, the example inner casing member 214 may be in a shape similar to a half-capsule shape that comprises a cylinder-shaped portion and a hemispherical end portion. In some embodiments, the width (which corresponds to a diameter) of the example inner casing member 214 is in the range of 1.0 millimeter and 4.0 millimeters. In some embodiments, the width of the example inner casing member 214 is 3.5 millimeters. In some embodiments, the thickness of the example inner casing member 214 is in the range of 0.2 millimeters to 0.3 millimeters. In some embodiments, the thickness of the example inner casing member 214 is 0.25 millimeters.

In some embodiments, the example inner casing member 214 may comprise material such as, but not limited to, stainless steel, beryllium copper, phosphor bronze, metal alloys, and/or the like. In some embodiments, the example inner casing member 214 may comprise other material(s). In some embodiments, the example inner casing member 214 may be formed through, for example but not limited to, a deep drawing process.

While the description above provides an example of an inner casing member, it is noted that the scope of the present disclosure is not limited to the description above. In some examples, an example inner casing member may comprise one or more additional and/or alternative elements, and/or may be in other shapes/forms. For example, an example inner casing member may be in shapes other than a half-capsule shape, such as, but not limited to, a cube shape, a sphere shape, a prism shape, a cone shape, a pyramid shape, and/or the like. Additionally, or alternatively, one or more measurements of the example inner casing member may be of other value(s).

In the example shown in FIG. 2B and FIG. 2C, an example membrane member 216 is disposed on the outer surface of the example inner casing member 214. In some embodiments, the example membrane member 216 comprises a membrane that is flexible and deforms when pressure is applied. In some embodiments, the example membrane member 216 may comprise material such as, but not limited to, silicon.

In the example shown in FIG. 2B and FIG. 2C, the example diaphragm member 212 comprises an example outer casing member 218.

In some embodiments, the example outer casing member 218 is disposed within the example sleeve member 208. In some embodiments, an edge of the example outer casing member 218 is secured to the example membrane member 216. For example, the example outer casing member 218 is hermetically sealed to the example membrane member 216.

In some embodiments, the example outer casing member 218 may be in a shape similar to a hollow cylindrical shape. In some embodiments, the width (which corresponds to a diameter) of the example outer casing member 218 is in the range of 3.0 millimeters and 4.0 millimeters. In some embodiments, the width of the example outer casing member 218 is 3 millimeters. In some embodiments, the thickness of the example outer casing member 218 is in the range of 0.02 millimeters and 0.08 millimeters. In some embodiments, the thickness of the example outer casing member 218 is 0.05 millimeters.

In some embodiments, the example outer casing member 218 may comprise material such as, but not limited to, stainless steel, beryllium copper, phosphor bronze, metal alloys, and/or the like. In some embodiments, the example outer casing member 218 may comprise other material(s). In some embodiments, the example outer casing member 218 may be formed through, for example but not limited to, a deep drawing process.

While the description above provides an example of an outer casing member, it is noted that the scope of the present disclosure is not limited to the description above. In some examples, an example outer casing member may comprise one or more additional and/or alternative elements, and/or may be in other shapes/forms. For example, an example outer casing member may be in shapes other than a hollow cylindrical shape, such as, but not limited to, a cube shape, a sphere shape, a prism shape, a cone shape, a pyramid shape, and/or the like. Additionally, or alternatively, one or more measurements of the example outer casing member may be of other value(s).

In the example shown in FIG. 2B and FIG. 2C, the example apparatus 200 comprises an example circuit board element 224, similar to the first example circuit board element 103 described above in connection with FIG. 1A and FIG. 1B. In some embodiments, the example circuit board element 224 is disposed within the example inner casing member 214, and is secured to an inner surface of the example inner casing member 214 through, for example but not limited to, a welding process. In some embodiments, the example circuit board element 224 comprises example conductive tracks 220 printed on the surface of the example circuit board element 224.

In some embodiments, the example circuit board element 224 has a width in the range of 1.0 millimeter to 3.0 millimeters. In some embodiments, the example circuit board element 224 has a width of 2.0 millimeters. In some embodiments, the example circuit board element 224 has a thickness in the range of 0.5 millimeters to 1.5 millimeters. In some embodiments, the example circuit board element 224 has a width of 1.0 millimeter.

In some embodiments, the example inner casing member 214 houses or otherwise contains insulator media 226. In some embodiments, the insulator media 226 comprises electrically insulating but thermally conductive material. Examples of insulator media 226 may include, but not limited to, silicon oil, mineral oil, fluorocarbon, synthetic, and/or the like. As such, the example circuit board element 224 is fully submerged in and/or encapsulated by the insulator media 226 (such as silicon oil). In some embodiments, the example circuit board element 224 is partially submerged in the insulator media 226 (such as silicon oil).

In the example shown in FIG. 2B and FIG. 2C, the example apparatus 200 comprises an example sensing element 222. In some embodiments, the example sensing element 222 is electrically coupled and secured to the example circuit board element 224. For example, the example sensing element 222 is electrically coupled to the one or more conductive tracks printed on the example circuit board element 224. In some embodiments, the example sensing element 222 is fully submerged in and/or encapsulated by the insulator media 226 (such as silicon oil). In some embodiments, the example sensing element 222 is partially submerged in the insulator media 226 (such as silicon oil).

In some examples, the example sensing element 222 provides capability to measure both pressure and temperature (for example, a MEMS pressure sensing die having temperature measure options using a Zt diode). In some embodiments, liquid substance (whose pressure is to be measured by the apparatus 200) may enter the cavity between the example sleeve member 208 and the example outer casing member 218 through the at least one media opening 210, and the liquid substance may be in contact with outer surface of the example membrane member 216. As described above, the example membrane member 216 comprises a membrane that is flexible and deforms when pressure is applied. As such, the pressure from the liquid substance is transferred to the example sensing element 222 through the example membrane member 216 and the example insulator media 226, and the example sensing element 222 generates an electrical signal corresponding to the pressure of the liquid substance. Additionally, the temperature of the liquid substance is transferred through the example membrane member 216 and the example insulator media 226, and the example sensing element 222 generates an electrical signal corresponding to the temperature of the liquid substance.

Figure 3:
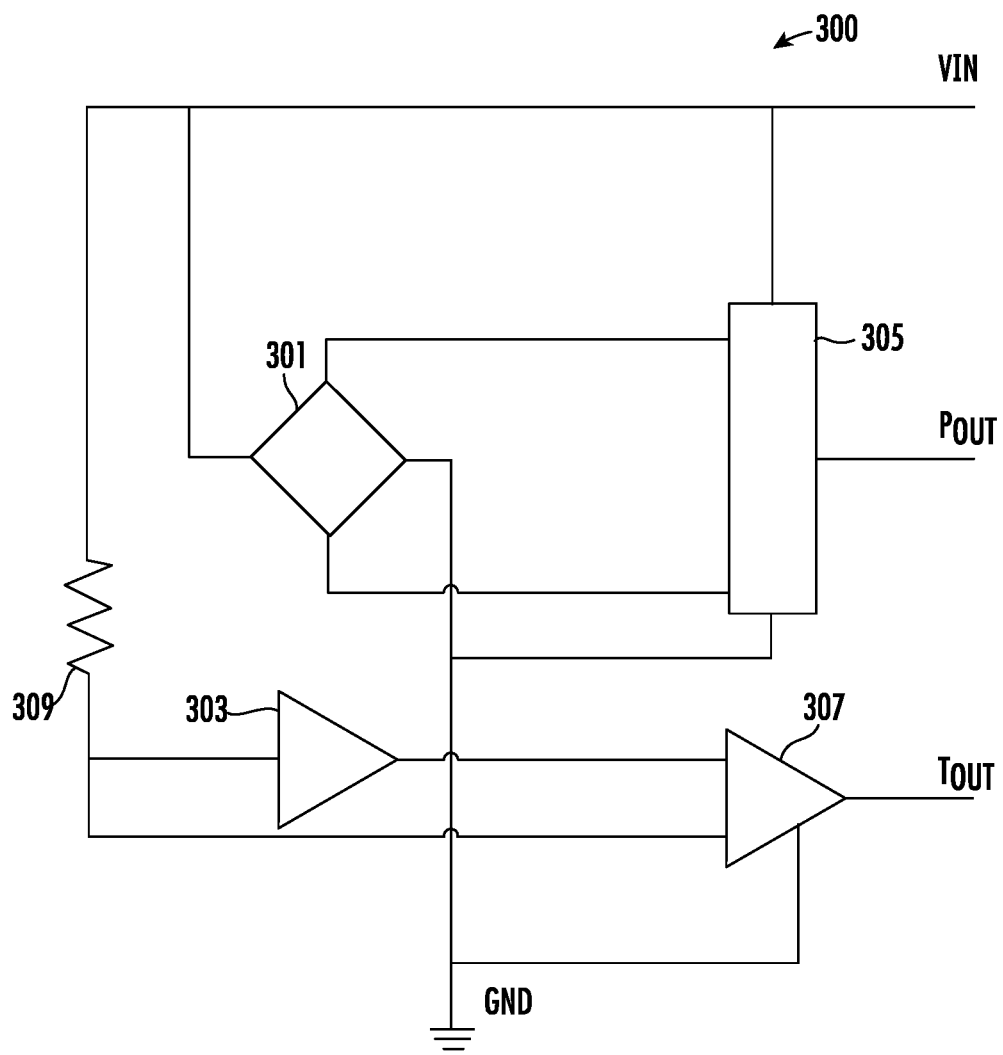
FIG. 3 illustrates an example circuit diagram associated with an example apparatus for sensing pressure and temperature in accordance with various embodiments of the present disclosure.

Referring now to FIG. 3, an example circuit diagram 300 in accordance with various embodiments of the present disclosure is illustrated.

In some embodiments, the example circuit diagram 300 corresponds to an example circuit that is printed on the first example circuit board element in accordance with various embodiments of the present disclosure (for example, the first example circuit board element 103 illustrated and described above in connection with FIG. 1A and FIG. 1B). In some embodiments, the example circuit diagram 300 corresponds to a combined circuit that includes a first circuit printed on the first example circuit board element in accordance with various embodiments of the present disclosure (for example, the first example circuit board element 103 illustrated and described above in connection with FIG. 1A and FIG. 1B) and a second circuit printed on the second example circuit board element in accordance with example embodiments of the present disclosure (for example, the second example circuit board element 133 illustrated and described above in connection with FIG. 1A and FIG. 1B).

For example, as described above, an example pressure sensing element (for example, the example pressure sensing element 105 illustrated and described above in connection with FIG. 1A, FIG. 1B, FIG. 4 and/or FIG. 5) is electrically coupled to a first circuit board element (for example, the first example circuit board element 103 illustrated and described above in connection with FIG. 1A and FIG. 1B). In the example circuit diagram 300, the example pressure sensing element is depicted as pressure sensing element 301. In some embodiments, the pressure sensing element 301 receives an excitation voltage $V_{in}$ and is electrically coupled to the ground. In some embodiments, the excitation voltage $V_{in}$ is within the range of 2.7 V to 40 V. In some embodiments, the excitation voltage $V_{in}$ is 5 V. In some embodiments, the pressure sensing element 301 generates an electrical signal corresponding to the detected pressure (for example, an electrical voltage that corresponds to the detected pressure).

In some embodiments, the first circuit board element comprises an example signal conditioning element, which is depicted as the signal conditioning element 305 in the example circuit diagram 300. As shown in FIG. 3, the pressure sensing element 301 is electrically coupled to the signal conditioning element 305 and provides the electrical signal corresponding to the detected pressure to the signal conditioning element 305.

In some embodiments, the signal conditioning element 305 is in the form of an example ASIC as described above. In some embodiments, the signal conditioning element 305 receives an excitation voltage $V_{in}$ and is electrically coupled to the ground. In some embodiments, the excitation voltage $V_{in}$ is within the range of 2.7 V to 40 V. In some embodiments, the excitation voltage $V_{in}$ is 5 V. In some embodiments, the signal conditioning element 305 is configured to provide signal conditioning function on the electrical signal received from the pressure sensing element 301, and output an electrical signal $P_{out}$ that has been conditioned and represents a detected pressure. In some embodiments, the signal conditioning element 305 in accordance with various embodiments of the present disclosure is an example ASIC. In some embodiments, the example ASIC may include one or more microprocessors electrically coupled to one or more memory units (such as, but not limited to, RAM, ROM, flash memory, and/or the like). In some embodiments, the one or more microprocessors of the example ASIC adjust, manipulate, and/or otherwise condition the electrical signal received from the pressure sensing element 301, and output the adjusted/manipulated/conditioned signal as $P_{out}$.

Further, as described above, an example temperature sensing element (for example, the example temperature sensing element 107 illustrated and described above in connection with FIG. 1A and FIG. 1B) is electrically coupled to a first circuit board element (for example, the first example circuit board element 103 illustrated and described above in connection with FIG. 1A and FIG. 1B). In the example circuit diagram 300, the example temperature sensing element is depicted as temperature sensing element 303. In some embodiments, the temperature sensing element 303 generates an electrical signal corresponding to the detected temperature.

In some embodiments, the first circuit board element comprises an example signal amplifying element, which is depicted as the signal amplifying element 307 in the example circuit diagram 300. As shown in FIG. 3, the temperature sensing element 303 is electrically coupled to the signal amplifying element 307 and provides the electrical signal corresponding to the detected temperature to the signal amplifying element 307. For example, the signal amplifying element 307 is an example INA. In such embodiments, the signal amplifying element 307 comprises three operational amplifiers, where a non-inverting amplifier is connected to each input of a differential amplifier In some embodiments, the first circuit board element comprises an example resistor element 309. As shown in FIG. 3, the example resistor element 309 is electrically coupled to the temperature sensing element 303 and is electrically coupled to the signal amplifying element 307. In some embodiments, the example resistor element 309 receives an excitation voltage $V_{in}$. In some embodiments, the excitation voltage $V_{in}$ is within the range of 5 V to 40 V. In some embodiments, the excitation voltage $V_{in}$ is 5 V.

In some embodiments, the temperature coefficient of the example temperature sensing element 303 is 2 mV/° C. For example, when the detected temperature increases, the voltage across example temperature sensing element 303 decreases. When the detected temperature decreases, the voltage across example temperature sensing element 303 increases. The differential voltage may further be scaled by the example resistor element 309, so that the voltage across the example temperature sensing element 303 is from 0.57 V to 1 V when the detected temperature is from −40° C. to 125° C. In some embodiments, the signal amplifying element 307 further amplifies the output to within the range of 0 V to 5 V.

In some embodiments, the signal amplifying element 307 receives an excitation voltage $V_{in}$ and is electrically coupled to the ground. In some embodiments, the excitation voltage $V_{in}$ is within the range of 2.7 V to 40 V. In some embodiments, the excitation voltage $V_{in}$ is 5 V. In some embodiments, the signal amplifying element 307 is configured to provide signal amplifying function on the electrical signal received from the temperature sensing element 303, and output an electrical signal $T_{out}$ that has been amplified and represents a detected temperature.

As such, in accordance with various embodiments of the present disclosure, an electric circuit of an example apparatus is configured to output a first electrical signal (for example, $P_{out}$) indicating a detected pressure and a second electrical signal (for example, $T_{out}$) indicating a detected temperature.

It is to be understood that the disclosure is not to be limited to the specific embodiments disclosed, and that modifications and other embodiments are intended to be included within the scope of the appended claims. Although specific terms are employed herein, they are used in a generic and descriptive sense only and not for purposes of limitation, unless described otherwise.

The invention claimed is:

1. An apparatus for sensing pressure and temperature comprising:
 a media isolation chamber assembly comprising a sleeve member and a bellows member, wherein the bellows member is disposed in the sleeve member;
 a first circuit board element;
 a pressure sensing element disposed in the bellows member and electrically coupled to the first circuit board element; and
 a temperature sensing element disposed in the sleeve member and electrically coupled to the first circuit board element.

2. The apparatus of claim 1, wherein the bellows member is hermetically sealed to the sleeve member.

3. The apparatus of claim 1, wherein the sleeve member comprises a body portion and a probe portion, wherein the body portion comprises a side section and an end section, wherein the side section is in a perpendicular arrangement with the end section.

4. The apparatus of claim 3, wherein the probe portion protrudes from an outer surface of the end section of the body portion of the sleeve member.

5. The apparatus of claim 3, wherein the temperature sensing element is disposed in the probe portion of the sleeve member.

6. The apparatus of claim 5, wherein the first circuit board element extends from within the bellows member to within the probe portion of the sleeve member.

7. The apparatus of claim 3, wherein the end section comprises at least one media opening that is configured to receive a liquid substance so that the liquid substance is in contact with the bellows member.

8. The apparatus of claim 1, wherein the sleeve member is in the form of a hollow cylinder.

9. The apparatus of claim 1 further comprising:
 a port assembly, wherein the sleeve member of the media isolation chamber assembly is secured to an outer surface of the port assembly.

10. The apparatus of claim 9, wherein the port assembly further comprises a tunnel connecting a first opening on the outer surface of the port assembly to a second opening on an inner surface of the port assembly.

11. The apparatus of claim 10, wherein the tunnel is configured to convey insulator media to the bellows member of the media isolation chamber assembly through the first opening on the outer surface of the port assembly.

12. The apparatus of claim 10 further comprising:
 a sealing member covering the second opening on the inner surface of the port assembly.

13. The apparatus of claim 9 further comprising:
 a second circuit board element disposed within the port assembly; and
 at least one terminal connector element electrically coupling the first circuit board element to the second circuit board element.

14. The apparatus of claim 13 further comprising:
 a header member comprising a glass-to-metal seal portion and secured to the first circuit board element and the port assembly.

15. The apparatus of claim 1 further comprising:
 a bellows member acting as a diaphragm and being in a form of an elastic tube that is compressed when pressure is applied to an outer surface of the elastic tube.

16. The apparatus of claim 15 further comprising:
 a signal conditioning element that is configured to output an electrical signal indicating a detected pressure.

17. The apparatus of claim 15, wherein the first circuit board element comprises a signal amplifying element, wherein the temperature sensing element is electrically coupled to the signal amplifying element.

18. The apparatus of claim 17, wherein the first circuit board element comprises a resistor element, wherein the resistor element is electrically coupled to the temperature sensing element and the signal amplifying element.

19. The apparatus of claim 18, wherein the signal amplifying element is configured to output an electrical signal indicating a detected temperature.

20. The apparatus of claim 1, wherein the first circuit board element is configured to output a first electrical signal indicating a detected pressure and a second electrical signal indicating a detected temperature.

* * * * *